Nov. 12, 1968

S. T. FREEMAN 3,409,986

DENTAL ARTICULATOR

Filed Oct. 24, 1965

INVENTOR

Stephen T. Freeman

BY Polachek & Saulsbury
ATTORNEYS.

Nov. 12, 1968                S. T. FREEMAN                3,409,986
                            DENTAL ARTICULATOR
Filed Oct. 24, 1965                                    3 Sheets-Sheet 2

INVENTOR
Stephen T. Freeman
BY  Polachek of Saulsbury
    ATTORNEYS

Nov. 12, 1968  S. T. FREEMAN  3,409,986
DENTAL ARTICULATOR

Filed Oct. 24, 1965 3 Sheets-Sheet 3

INVENTOR
Stephen T. Freeman
BY
Polachek & Saulsbury
ATTORNEYS

United States Patent Office

3,409,986
Patented Nov. 12, 1968

3,409,986
DENTAL ARTICULATOR
Stephen T. Freeman, 10–12 W. Fulton St.,
Gloversville, N.Y. 12078
Filed Oct. 24, 1965, Ser. No. 504,453
4 Claims. (Cl. 32—32)

ABSTRACT OF THE DISCLOSURE

A dental articulator in which two teeth aligning plates are provided. The plates are respectively attached to upper and lower base members by means which permit both angular and vertical adjustments. The upper base member is elevated and supported by pin elements, two of which rest on vertically adjustable platforms.

---

This invention relates to artificial dentures and more particularly to an improved articulator which will accurately record and produce an accurate simulation of various movements of the lower jaw and thereby reproduce different positions of a patient's teeth under various conditions.

It is commonly known that a set of impressions is first made of the patient's jaws. From these impressions, upper and lower models are made which are then secured within an articulator which serves to mount the models in spaced relationship with respect to each other corresponding to the proper relation of the patient's jaws. Thereafter, a bite record is taken from the patient in an over-closed jaw relation, then simulated in the articulator thereby recreating the proper spacing between the upper and lower jaws.

During the setting operation, the plate of the articulator carrying the upper model is pivoted or otherwise moved relative to the lower model in an action simulating the action of jaws, thus insuring to a considerable degree that the teeth set in the material will have proper occlusion and balance.

Prior to the present invention, heretofore known articulators have not completely succeeded in solving the problem of absolute accuracy in transferring the natural movements of the patient's jaw to the articulator. More than often additional grinding and fittings are necessary before the dentures properly fit the patient's mouth, even then post fittings and adjustments are frequently required.

It is therefore an object of the invention to provide a construction whereby the jaw models may move relative to one another about the proper axes thus correctly transferring the human mandibular movements onto an articulator.

Another object of the invention is to provide an improved dental articulator which includes two teeth aligning plates which can be angularly adjusted in the desired occlusal plane and being so mounted whereby it may be shifted to properly set all of the patient's artifical teeth and at the same time will remain in the predetermined occlusal plane.

Yet another object of the invention is to provide an articulator that eliminates the necessity of any adjustment for duplicating the human lower jaw joints, all of the adjustments being done directly to the jaw. Most conventional articulators use adjustments to duplicate the jaw movements, by adjusting the parts of the articulator, imitating the joints. In the present invention, adjustments are made directly to the dentures, thus eliminating the incorrect movement of the jaws by movements in the joints.

Another object of the invention is to provide mechanical support means for vertical alignment of each of the templates and to insure the desired accuracy of the selected occlusal plane.

Another object of the invention is the provision of a plurality of novel circular guide plates for the pin elements which are adapted to adjust the vertical elevation of the articulator in accordance with requirements of the occlusal plane.

The invention also has for its objects to provide such means that are positive in operation, convenient in use, easily installed in a working position and easily disconnected therefrom, economical to manufacture, relatively simple, and of general superiority and serviceability.

The invention also comprises novel details of construction and novel combinations and arrangements of parts, which will more fully appear in the course of the following description. However, the drawings merely show and the following description merely describes one embodiment of the present invention, which is given by way of illustration or example only.

Figure 1:
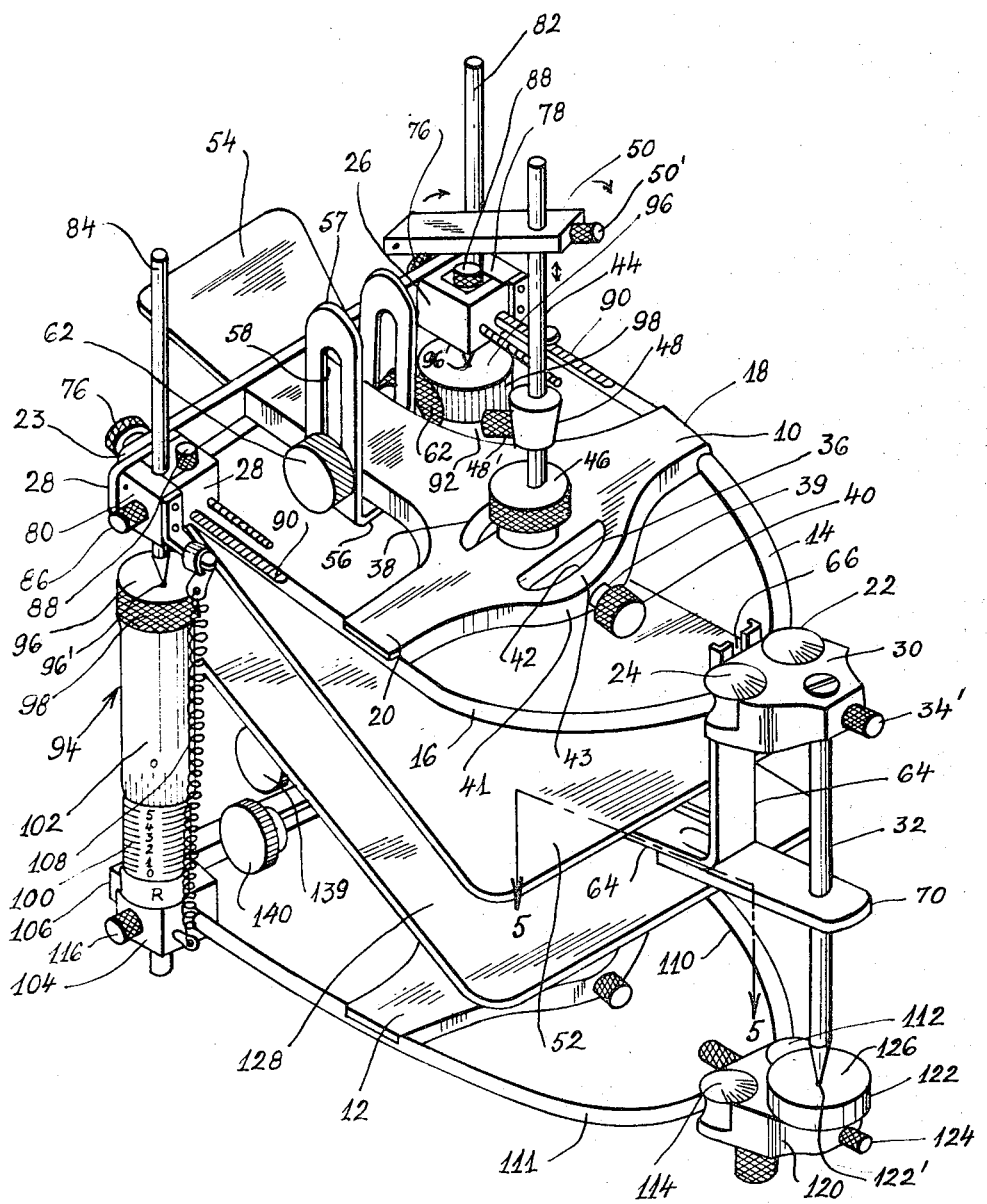
FIGURE 1 is a general perspective view of one form of the dental articulator of the present invention.
Figure 2:
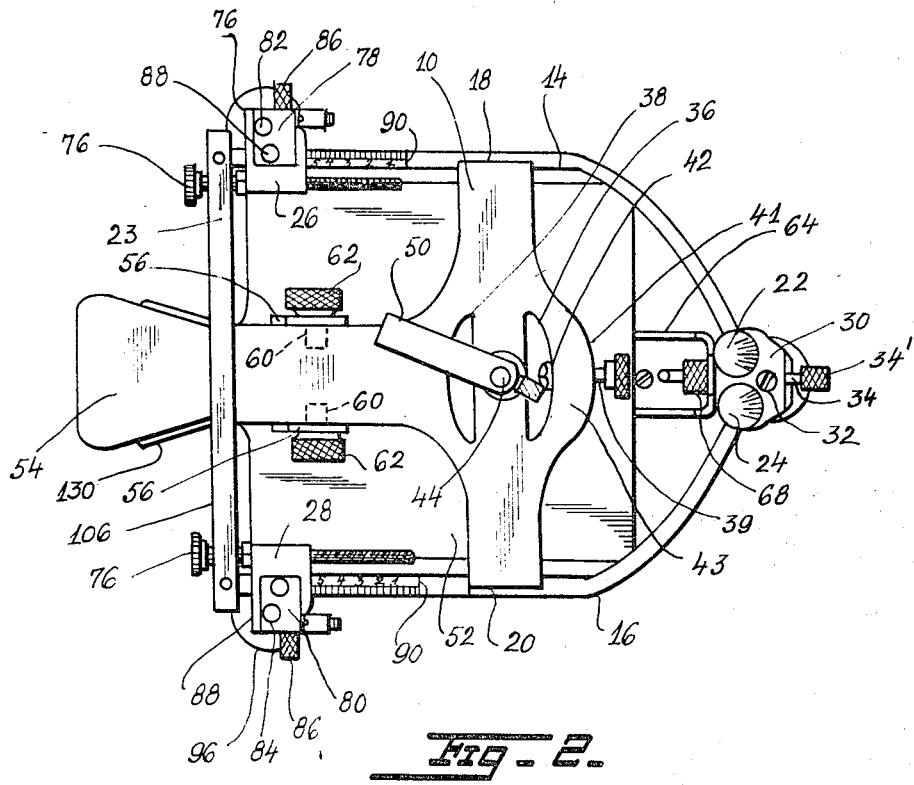
FIG. 2 is a top view of the articulator illustrated in FIG. 1 of the drawings.
Figure 4:
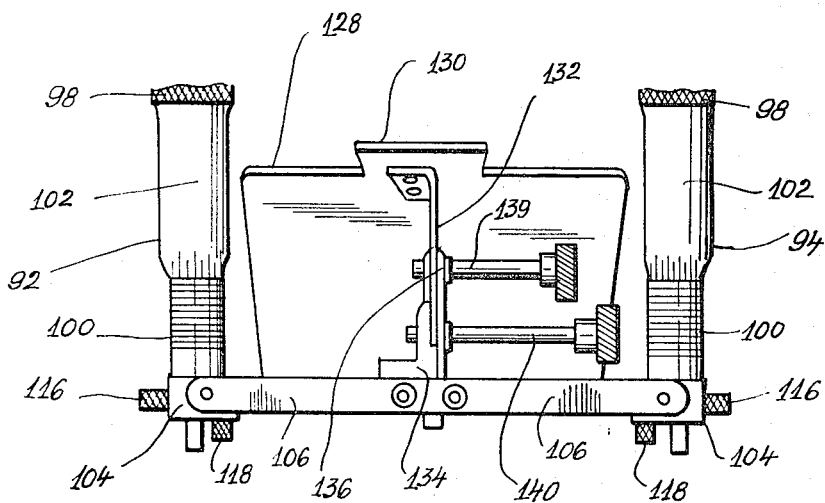
FIG. 4 is a rear elevational view of the articulator illustrated in the previous figures, having the upper portion broken away.
Figure 3:
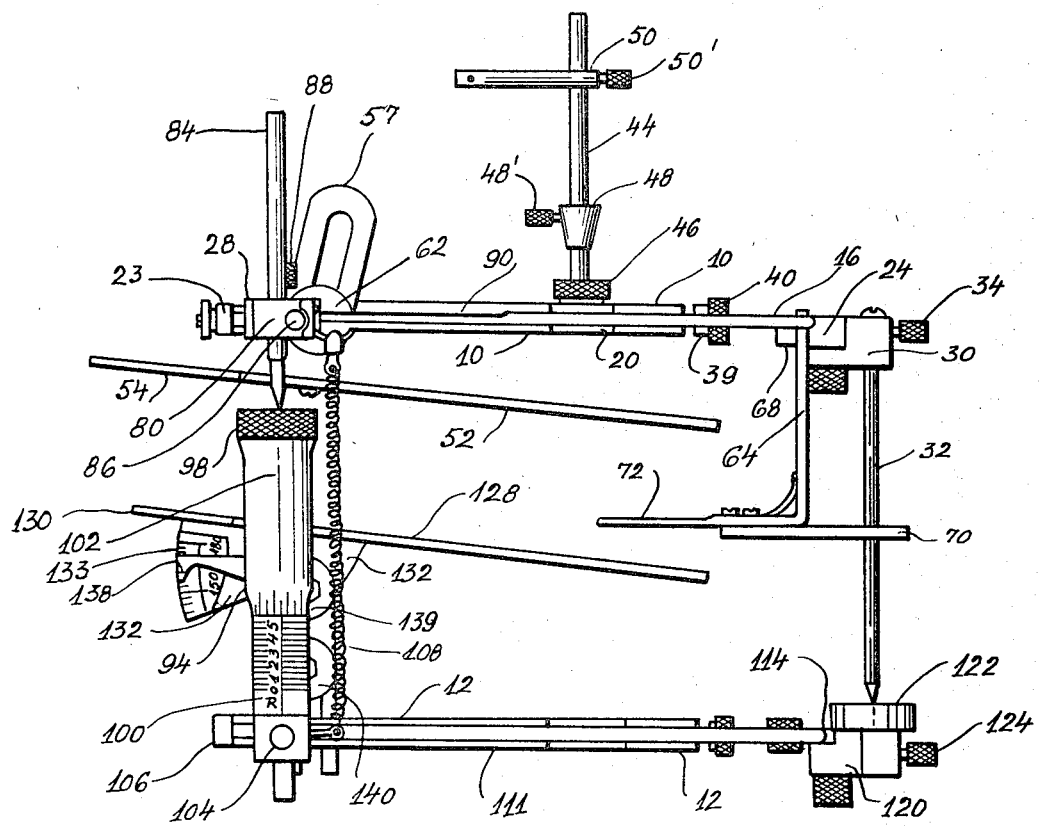
FIG. 3 is a side elevational view of the articulator structure of FIGS. 1 and 2.

Referring in detail to the drawings, wherein the like numerals designate the like parts throughout the several figures of the drawings and the articulator illustrated therein shows the upper base member 10 and the lower base member 12. A curved metallic rod 14 is attached to one side 18 of base member 10, one end of rod 14 terminates within the disk 22, the other end of rod 14 passes through the bracket 26 and terminates within the horizontally disposed arm 23. A curved metallic rod 16 is attached to the other side 20 of base member 10, one end of rod 16 terminates within the disk 24, the other end passes through the bracket 28 and terminates within arm 23. Both disks 22 and 24 are located within the block 30. In addition to the disks 22 and 24, block 30 includes the upper portion of downwardly extending vertical supporting pin 32. A locking screw 34' having a thumb nut 34 is horizontally located within block 30 and is capable of locking the supporting pin 32 within block 30. Base member 10 includes two semicircular slots 36 and 38. Between the outer edge 41 of base member 10 and the slot 36 there is a horizontal disposed screw 39, located within the portion 43 of the base member 10 and having a knurled knob 40 and a spherical securing attachment 42 on the other end thereof.

An elongated round rod 44 with a screw threaded bottom end is mounted in a threaded hole in the base member 10 between the slots 36 and 38. The rod 44 supports a plate-like member 50 rotatable and slidable thereon as shown by the arrows in FIG. 1, the member 50 being provided with a set screw 50' for securing the member to the rod in adjusted position. A sleeve member 48 is rotatably and slidably mounted on the rod 44 below the plate member 50, and is provided with a set screw 48' for holding the sleeve in adjusted position on the rod. A knurled nut member 46 is integrally formed adjacent the bottom of the rod for turning the rod.

Figure 5:
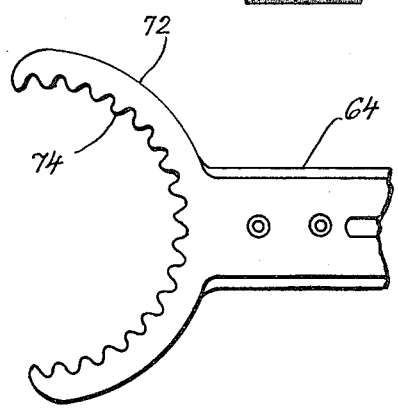
FIG. 5 is a view taken along lines 5—5 in FIG. 1.

Beneath the upper member 10, there is a metallic plate 52, having a handle 54, rigidly connected to the member 10 by means of a U-shaped bracket 56 mounted on the top of the plate 52. In each leg 57 of the bracket 56 there is an elongated, upwardly extending slot 58 adapted to accommodate screws 60, having their respective thumb nuts 62 at the ends of said screws and extending outwardly through slots 58 of the bracket 56. If it is desired to angularly adjust or/and vertically dispose plate 52, the screws 60 are loosened by means of their respective thumb nuts. After the desired angular and/or vertical position is selected for the most suited maxillary position, the screws 60 are tightened thus preventing the movement of the plate 52. The angular and vertical movability of plate 52 is limited by rods 14 and 16 and a L-shaped holding bracket 64. The top portion of this bracket includes a vertical slot 66 and is connected with the block 30 by means of an adjusting screw 68. The bottom part of the bracket 64 is rigidly connected to one end of a plate 70, the other end of said plate having a hole to accommodate the vertical pin 32 which is adapted to move vertically within the hole of plate 70. The bottom end of the bracket 64 is integrally connected with a fork-like, semicircular supporter 72 of dental models. This supporter (see FIG. 5) includes a plurality of toothlike configurations 74 located on the inside thereof for the purpose of gripping of dental models. It should be noted that due to provision of slot 66 the bracket and supporter can be vertically adjusted for aligning the upper and lower models in the articulator, thus eliminating the need of a conventional facebow. Adjusting screws 76 pass through the end portions of the horizontal arm 23 and brackets 26 and 28 and are adapted to position brackets 26, 28 on the graduated portions 90 of the rods 14, 16. Blocks 78, 80 are positioned within the brackets 26 and 28. Vertically positioned guide pins 82 and 84 penetrate through blocks 26, 28 and are secured thereto by means of screws 86. Also screws 88 are provided for securing block 26 to rod 14 and block 28 to rod 16. The rods 14 and 16 are graduated as shown at 90 to indicate the exact locations of brackets 26, 28 thus also indicating the positions of guide pins 82, 84 relative to vetrical posts 92, 94 for supporting the upright guide pins 82, 84 so that the guide pins are positioned on the circular platforms 96 so that vertical alignment of the dentures can be achieved. The upper surfaces of the platforms have indentations 96' at the exact centers thereof. Knurled bands 98 surround the upper portions of posts 92, 94 thus enabling them to turn said posts. Each post 92 or 94 consists of an accurately threaded screw portion 100 with a slidable head portion 102 that is divided into an integral number of divisions on its rim. The whole number of revolutions of the screw portion 100 is read on the graduated scale position thereon when it is uncovered by the head portion 102 as it moves upwardly. In actual operation posts 92, 94 can be compared with that of the micrometer calipers. Posts 92 and 94 are positioned on blocks 104 which are connected to each other by means of an arm 106. Vertically disposed removable springs 108 are provided for connecting blocks 104 to blocks 78, 80. This arrangement provides a very flexible yet effective means for holding the articulator together or, if desired, the articulator can be separated for more effective insertion or positioning of mandible and maxillary members.

A curved metallic rod 110 is attached to one side of base member 12, one end of rod 110 terminates within a disk 112, the other end of rod 110 passes through block 104 and terminates within arm 106. Another curved metallic rod 111 is attached to the opposing side of base member 12, one end of rod 111 terminates within a disk 114, the other end of rod 111 passes through block 104 and terminates within arm 106. Each block 104 has adjusting screws 116 for locking posts 92, 94 thereto and screws 118 positioned at the bottom of blocks 104 for locking of the rods 110, 111 to the blocks. Disks 112, 114 are located within the block 120. Block 120 includes a circular guide plate 122 which is positioned thereon and secured by the adjusting screw 124. The bottom tip of the upwardly extending pin 32 is connected with the face portion 126, of the circular guide plate 122, and the face portion 126 is formed with an indentation 122' at the exact center thereof. The indentation 122' serves with the indentations on the posts 92 and 94 as a guide point in the movement of the denture towards the other denture.

Between the semicircular support 72 of the bracket 64 and the lower base member 12 is a metallic plate 128 having a handle 130 integrally connected thereto. The bottom surface of the plate is rigidly connected to a bracket 132, a portion of which is graduated as indicated at 133 to show angular displacement of plate 128. Bracket 132 is rotatably mounted on a mounting stand 134. The upper portion 136 of the stand 134 has an indexing marker 138 coacting with scale 133 for establishing the exact angular position of plate 128. An adjusting screw 139 is provided for angular positioning of the plate, and a screw 140 locks the plate 128 at the desired vertical elevation.

In carrying out this invention the maxillary and mandibular members are positioned and secured in any desired manner to the bottom surface of plate 52 and the upper surface of plate 128. The upper plate 52 may be manually vertically moved in the upward or downward directions by loosening screws 60, 62. Also, these screws 60, 62 provide a pivoting point for the above mentioned plate 52, so that plate 52 can be placed in the most advantageous position for the adjustment of the maxillary member. The bottom plate 128 is adjusted by screw 140 so that said plate can be moved upwards or downwards. The angular adjustment of plate 128 is achieved by turning of the screw. The angular adjustment is visibly indicated on the angular graduation scale 133 of the bracket 132. The front portion of the dentures is supported by semi-circular support 72 of the bracket 64 which can be moved upwards or downwards in accordance with the position of the dentures which is positioned between plates 52, 128. Once the dentures are positioned the absolute adjustment and/or correction of the dental models may be achieved by turning the adjustment screws 76 to horizontally move brackets 26, 28 on the graduated portions 90 of the metallic rods 14, 16. This changes the positions of guide pins 82, 84 and the vertical posts 92, 94 with respect to upper plate 52. In order to correct the vertical position of the upper plate 52 the knurled bands 98 on the vertical posts can be turned.

By means of the articulator herein disclosed, it is now possible to duplicate the full and exact movements of a patient's jaws, so as to be able to make a set of dentures whose tooth surfaces have proper relative inclinations to enable the teeth to move properly without interference.

This invention is not limited, of course, to the specific details of construction of the articulator itself. In the general form the articulator does resemble the conventional articulator, but it has modified structure to embody various features of construction that enable the parts to move and operate in accordance with the movements of the human jaw.

What I claim is:

1. A dental articulator comprising an upper base member, an upper plate for holding maxillary dentures, said base member being pivotally connected with said upper plate, said upper plate being adapted for vertical movements, a first pair of metallic rods, positioning means slidingly mounted on each of said rods, said base member being rigidly connected with each of said rods, a vertically disposed first arm, a first block, each of said rods terminating within said arm and said first block, adjustable means adapted to adjust said positioning means on each of said rods, a lower base member, a lower plate for holding mandibular dentures, said lower base member being pivotally connected with said lower plate, (a) an angular supporting stand having an elongated slot being mounted on said lower base member, a bracket pivotally attached to the upper portion of said stand, the upper portion of said bracket being rigidly connected to said lower plate, an adjustable screw protruding through said stand and said bracket for angular disposition of said lower plate, another adjustable screw positioned within said slot of said stand for vertical disposition of said lower plate, a second pair of metallic rods, said base member being rigidly connected with each of said rods, a vertically disposed arm, a second block having a circular guide plate located thereon, each of said rods terminating within said second block and said arm, a guide pin extending between said first and said second blocks, a supporting bracket extending downwardly from said first block to secure said dentures when they are positioned between said upper and lower plates, said positioning means including a block, a bracket, a direction pin vertically protruding through said latter block and resting on the top of said upright supporting means, a locking screw for securing said direction pin within said latter block said bracket partially enclosing said latter block and having a horizontally disposed hole for said rod, a screw for locking said rod within said bracket and said latter block, said bracket having another horizontal hole for said adjustable means.

2. An articulator as claimed in claim 1, wherein said adjustable means includes a horizontally disposed adjustable screw which is adapted to penetrate through said first arm and said bracket, and a hand knob on one end of said screw for adjusting said bracket, said latter block and said direction pin on said rod, a part of the upper portion of said rod including a graduated scale positioned thereon for registration of the movements of said bracket on said rod.

3. A dental articulator as defined in claim 1 wherein said upright supporting means includes a sliding block having a horizontally disposed hole for mounting said block on one of said rods of said second pair of metallic rods, a vertical post having a circular platform for supporting said direction pin, a head portion, a screw portion, said head portion being rotatably superimposed on said screw portion, horizontally disposed graduation markings on the rim of said head portion, a plurality of vertical graduation markings on said screw potrion, a knurled knob on the upper part of said head portion so that when said knob is turned the head portion travels vertically on said screw portion causing different numerical readings on said screw portion and said head portion which corresponds to the height achieved by said vertical post at any given instant, said vertical post being removably connected with said block and a locking screw for securing said vertical post to said block.

4. A dental articulator comprising an upper base member, an upper plate for holding maxillary dentures, said base member being pivotally connected with said upper plate, said upper plate being adapted for vertical movements, a first pair of metallic rods positioning means slidingly mounted on each of said rods, said base member being rigidly connected with each of said rods, a vertically disposed first arm, a first block, each of said rods terminating within said arm and said first block, adjustable means adapted to adjust said positioning means on each of said rods, a lower base member, a lower plate for holding mandibular dentures, said lower base member being pivotally connected with said lower plate, a supporting stand having an elongated slot being mounted on said lower base member, a bracket pivotally attached to the upper portion of said stand, the upper portion of said bracket being rigidly connected to said lower plate, an adjustable screw for angular disposition of said lower plate, another adjustable screw positioned within said slot of said stand for vertical disposition of said lower plate, a second pair of metallic rods, said base member being rigidly connected with each of said rods, a vertically disposed arm, a second block having a circular guide plate located thereon, each of said rods terminating within said second block and said arm, a guide pin extending between said first and said second blocks, a supporting bracket extending downwardly from said first block to secure said dentures when they are positioned between said upper and lower plates, upright supporting means mounted in said second pair of rods and being adapted to vertically position said upper plate to effect alignment between said maxillary and mandibular dentures, said supporting bracket including an upward flange having a vertical slot positioned therein said upward flange connected at one end to a supporter of dental models, a semi-circular holding portion having a plurality of tooth like configurations located within said holding portion, said holding portion being in a perpendicular relationship with said upward flange; a horizontal plate one end of which being secured to the bottom of said supporting bracket; the other end of said plate having a hole adapted to receive said guide pin; and said supporting bracket and said plate adapted for vertical movement so that they are capable of being positioned at the dentures.

References Cited

UNITED STATES PATENTS

| | | | |
|---|---|---|---|
| 1,574 | 4/1840 | Cameron | 32—32 |
| 824,096 | 6/1906 | Crate | 32—32 |
| 1,022,055 | 4/1912 | Weiss | 32—32 |
| 1,050,933 | 1/1913 | Evans | 32—32 |
| 1,080,809 | 12/1913 | Burch | 32—32 |
| 2,434,415 | 1/1948 | Kile | 32—32 |

LOUIS G. MANCENE, *Primary Examiner.*

S. NATTER, *Assistant Examiner.*